(12) United States Patent
Park et al.

(10) Patent No.: US 10,403,277 B2
(45) Date of Patent: Sep. 3, 2019

(54) METHOD AND APPARATUS FOR INFORMATION SEARCH USING VOICE RECOGNITION

(71) Applicant: AMADAS Co., Ltd., Seoul (KR)

(72) Inventors: Eun-Min Park, Seongnam-si (KR); Sang-Woo Jung, Busan (KR); Gi-Young Kim, Anyang-si (KR)

(73) Assignee: AMADAS CO., LTD., Seoul (KR)

( * ) Notice: Subject to any disclaimer, the term of this patent is extended or adjusted under 35 U.S.C. 154(b) by 0 days.

(21) Appl. No.: 15/570,587

(22) PCT Filed: Mar. 4, 2016

(86) PCT No.: PCT/KR2016/002168
§ 371 (c)(1),
(2) Date: Oct. 30, 2017

(87) PCT Pub. No.: WO2016/175443
PCT Pub. Date: Nov. 3, 2016

(65) Prior Publication Data
US 2018/0137859 A1    May 17, 2018

(30) Foreign Application Priority Data
Apr. 30, 2015  (KR) .................. 10-2015-0061412

(51) Int. Cl.
*G10L 15/22*    (2006.01)
*G06F 16/61*    (2019.01)
(Continued)

(52) U.S. Cl.
CPC .............. *G10L 15/22* (2013.01); *G06F 3/167* (2013.01); *G06F 16/00* (2019.01); *G06F 16/61* (2019.01);
(Continued)

(58) Field of Classification Search
None
See application file for complete search history.

(56) References Cited

U.S. PATENT DOCUMENTS 5,504,741 A * 4/1996 Yamanaka .......... H04L 12/5601
                                                                  370/412
5,640,485 A * 6/1997 Ranta ...................... G10L 15/22
                                                                  704/251
(Continued)

FOREIGN PATENT DOCUMENTS

JP        2008-309865 A    12/2008
KR    10-2006-0063420 A     6/2006
(Continued)

*Primary Examiner* — Jonathan C Kim
(74) *Attorney, Agent, or Firm* — Rabin & Berdo, P.C.

(57) ABSTRACT

The present invention relates to a method and an apparatus for information search and, specifically, to a method and an apparatus for information search using voice recognition, which, when voice data inputted through a microphone is present in a user-defined database and is repeatedly inputted, searches for information corresponding to the voice data and provides the information to a user. To this end, the method for information search using voice recognition according to the present invention comprises the steps of: when voice data is inputted through a microphone, comparing the inputted voice data with voice data stored in a user-defined voice database; when coincident voice data is present as a result of the comparison, determining whether a repeated voice data input is set; when the repeated voice data input is set as a result of the determination, ascertaining whether voice data coincident with the inputted voice data is present in an internal memory; and when the coincident voice data is present as a result of the ascertainment, outputting an event and requesting information corresponding to the voice data from a search server.

8 Claims, 2 Drawing Sheets

(51) Int. Cl.
*G06F 16/683* (2019.01)
*G10L 15/30* (2013.01)
*G10L 25/51* (2013.01)
*G06F 3/16* (2006.01)
*G06F 16/00* (2019.01)

(52) U.S. Cl.
CPC ............ *G06F 16/683* (2019.01); *G10L 15/30* (2013.01); *G10L 25/51* (2013.01); *G10L 2015/223* (2013.01)

(56) References Cited

U.S. PATENT DOCUMENTS

| | | | |
|---|---|---|---|
| 8,489,398 B1* | 7/2013 | Gruenstein | G10L 15/08 704/231 |
| 8,965,765 B2* | 2/2015 | Zweig | G10L 15/1822 704/251 |
| 9,503,688 B1* | 11/2016 | Lindberg | H04N 7/155 |
| 9,564,124 B2* | 2/2017 | Boss | G10L 15/02 |
| 2002/0010916 A1* | 1/2002 | Thong | H04N 5/278 725/1 |
| 2002/0093944 A1* | 7/2002 | Shen | H04M 3/4938 370/352 |
| 2003/0046071 A1* | 3/2003 | Wyman | G10L 15/22 704/235 |
| 2004/0193425 A1* | 9/2004 | Tomes | G06Q 30/02 704/273 |
| 2005/0071161 A1* | 3/2005 | Shen | G10L 15/22 704/236 |
| 2006/0074651 A1* | 4/2006 | Arun | G10L 15/22 704/233 |
| 2007/0124149 A1* | 5/2007 | Shen | G10L 15/26 704/275 |
| 2007/0198269 A1* | 8/2007 | Braho | G10L 15/01 704/270 |
| 2008/0228482 A1* | 9/2008 | Abe | G10L 15/1815 704/249 |
| 2009/0210233 A1* | 8/2009 | Thompson, III | G10L 15/26 704/275 |
| 2009/0313016 A1* | 12/2009 | Cevik | G10L 15/22 704/241 |
| 2011/0077942 A1* | 3/2011 | Ljolje | G10L 15/065 704/244 |
| 2012/0101821 A1* | 4/2012 | Tsuda | G10L 15/06 704/243 |
| 2012/0127072 A1* | 5/2012 | Kim | G10L 15/24 345/156 |
| 2013/0226591 A1* | 8/2013 | Ahn | G06F 3/167 704/275 |
| 2013/0262117 A1* | 10/2013 | Heckmann | G10L 15/22 704/255 |
| 2015/0019215 A1* | 1/2015 | Shin | G10L 15/20 704/233 |
| 2015/0106099 A1* | 4/2015 | Choi | G06F 3/167 704/246 |
| 2015/0149163 A1* | 5/2015 | VanBlon | G10L 15/08 704/231 |
| 2015/0199965 A1* | 7/2015 | Leak | G10L 15/22 704/249 |
| 2015/0243278 A1* | 8/2015 | Kibre | G10L 15/075 704/243 |
| 2015/0261496 A1* | 9/2015 | Faaborg | G06F 3/167 715/728 |
| 2015/0340030 A1* | 11/2015 | Sekiguchi | G10L 15/083 704/254 |
| 2015/0348548 A1* | 12/2015 | Piernot | G10L 15/22 704/235 |
| 2016/0063998 A1* | 3/2016 | Krishnamoorthy | G10L 15/02 704/254 |
| 2016/0372108 A1* | 12/2016 | Boss | G10L 15/02 |
| 2017/0092278 A1* | 3/2017 | Evermann | G10L 17/24 |
| 2018/0254035 A1* | 9/2018 | Kulkarni | G10L 15/02 |

FOREIGN PATENT DOCUMENTS

KR    10-1309794 B1    9/2013
WO    WO-2012/081788 A1    6/2012
WO    WO-2015/023138 A1    2/2015

\* cited by examiner

METHOD AND APPARATUS FOR INFORMATION SEARCH USING VOICE RECOGNITION

TECHNICAL FIELD

The present invention relates to a method and an apparatus for searching information, and more particularly, to a method and an apparatus for searching information using voice recognition, which, when voice data inputted through a microphone is present in a user-defined database and is repeatedly inputted, search for information corresponding to the voice data and provide the information to a user.

BACKGROUND ART

Smartphones have become very popular smart devices as they are easy to carry and are equipped with various functions, such as data communication, schedule management, Internet search, location-based service, or the like, integrated into a small size. However, users may have inconvenience when using smartphones to input data, search for information, and perform various functions due to small-sized terminal screens.

In particular, when users try to input text data in order to search for data or to operate various programs, the inconvenience increases. Methods applying voice recognition are being researched as methods for enhancing such user interfaces. These methods enable devices to recognize users' voices and to execute or control programs on the devices or to input data.

In addition, service for recognizing a user's voice and searching for a variety of information corresponding to the voice is realized in recent smartphones.

That is, related-art voice recognition-based service is provided based on the assumption that a voice consciously and intentionally uttered by a user is inputted and corresponding information is provided immediately as the voice is recognized.

However, since this method continuously searches and provides information as a user's voice is recognized, words unintentionally and inadvertently spoken by the user are also recognized and corresponding information is outputted. In a state in which a voice recognition module is activated, the information provided as search is redundantly performed according to voice recognition may be rather a noise or pollution to users.

DISCLOSURE

Technical Problem

The present invention has been developed to solve the above-mentioned problems, and an object of the present invention is to provide a method and an apparatus for searching information using voice recognition, which can prevent undesired information from being provided because information search is redundantly performed as user's voices are recognized.

Another object of the present invention is to provide a method and an apparatus for searching information using voice recognition, which can search information close to the contents that a user is interested in through a user's voice, regardless of whether the user's voice is intentional or unintentional.

Technical Solution

According to an aspect of the present invention, there is provided a method for searching information using voice recognition, the method comprising the steps of: when voice data is inputted through a microphone, comparing the inputted voice data and voice data stored in a user-defined voice database; when matching voice data is present as a result of the comparing, determining whether a repeated input of the voice data is set; when the repeated input of the voice data is set as a result of the determining, determining whether voice data matching the inputted voice data is present in an internal memory; and, when matching voice data is present as a result of the determining, outputting an event and requesting information corresponding to the voice data from a search server.

According to another aspect of the present invention, there is provided an apparatus for searching information using voice recognition, including: a user-defined voice DB configured to store voice data which is a target for searching information; a voice comparison unit configured to compare voice data inputted through a microphone and voice data stored in the user-defined voice DB; a memory configured to temporarily store the voice data inputted through the microphone; a communication unit configured to exchange data with a search server; and a controller configured to, when matching voice data is present as a result of comparing by the voice comparison unit and a repeated input of the voice data is set, determine whether voice data matching the voice data inputted through the microphone is present in the memory, and, when the matching data is present, to output an event and generate a signal for requesting information corresponding to the voice data from the search server.

Advantageous Effects

As described above, since information corresponding to voice data is only searched when voice data inputted through the microphone is present in the user-defined voice DB and also is repeatedly inputted, information can be prevented from being automatically searched with respect to words inadvertently or unintentionally uttered by a user.

Accordingly, since there is a high probability that users intentionally repeat words to be searched or unintentionally repeat words about the contents that they are interested in even if they do not intend, the present invention has effects of preventing unnecessary information search and rapidly providing the best information to users.

BEST MODE

Figure 1:
FIG. 1 is a schematic configuration diagram of an information search system according to the present invention.

Hereinafter, embodiments according to the present invention will be described in detail with reference to the accompanying drawings. A configuration of the present invention and an effect resulting therefrom will be clearly understood based on the following detailed descriptions.

In the detailed description of the present invention, the same reference numerals are used for the same elements even if they are represented on different drawings, and detailed descriptions of well-known configurations will be omitted since they would unnecessarily obscure the subject matters of the present invention.

FIG. 1 illustrates a schematic configuration of an information search system using voice recognition according to the present invention.

Referring to FIG. 1, the information search system may include an information search terminal 100 which is carried by a user, and a search server 200 which is owned by a service provider, and the information search terminal 100 and the search server 200 are mutually connected to each other through a communication network.

The information search terminal 100 is a device that is provided with a voice recognition module to recognize a user's voice and to receive a variety of information corresponding to the recognized voice from the search server 200, and to output the information to the user.

The information search terminal 100 may be a device such as a smart phone, a tablet personal computer (PC), a notebook PC, a PC, or the like, but is not limited thereto. The information search terminal 100 may be a dedicated device for information search, or may be implemented by integrating an information search function into a IoT-based door lock, car, or home network system, not as a separate device.

The search server 200 may receive an information search request based on voice recognition from the information search terminal 100, and may search for information corresponding to the recognized voice through a search engine and provide the searched information to the information search terminal 100.

Figure 2:
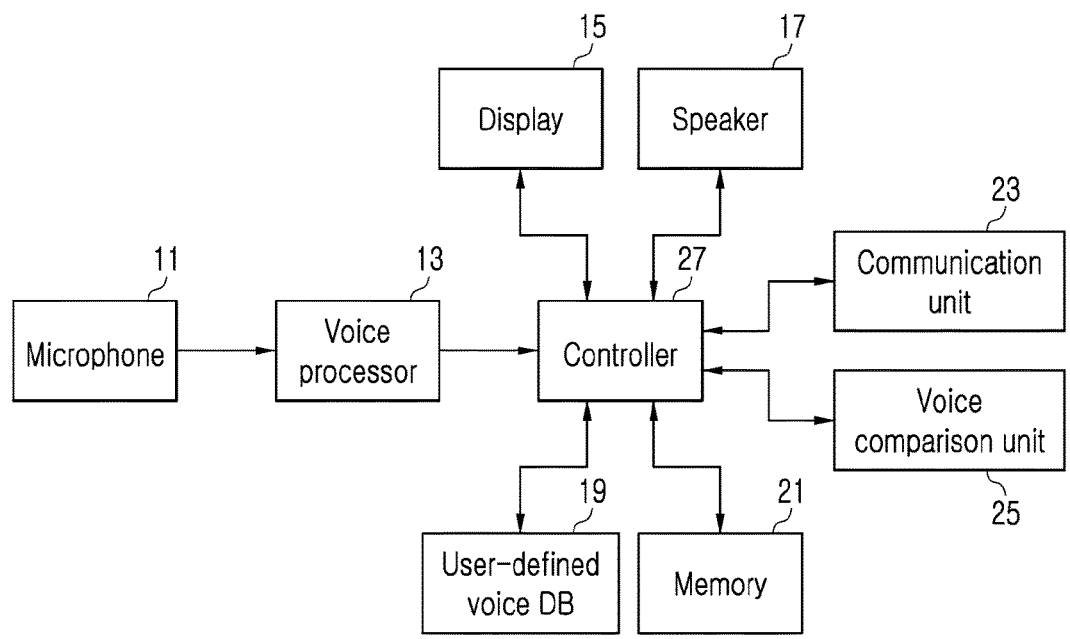
FIG. 2 is an interior configuration diagram of an information search apparatus using voice recognition according to the present invention.

FIG. 2 illustrates an interior configuration of an information search apparatus using voice recognition according to the present invention.

Referring to FIG. 2, the information search apparatus using the voice recognition may include a microphone 11, a voice processor 13, a display 15, a speaker 17, a user-defined voice DB 19, a memory 21, a communication unit 23, a voice comparison unit 25, and a controller 27.

The microphone 11 may convert a user's voice into an electric signal, and the voice processor 13 may process the electric signal inputted from the microphone 11 and convert it into a digital signal. Voice data, which is the digital signal processed by the voice processor 13, may be inputted to the controller 27.

The display 15 is a part that visually outputs a state of the information search apparatus, and in particular, displays a variety of information corresponding to the recognized voice for the user. The display 15 may be implemented by using a touch screen, and in this case, the display 15 may perform a role of an input interface in addition to a display function.

According to an exemplary embodiment of the present invention, the user may set a repeated input through the input interface of the display 15. Herein, setting the repeated input refers to a search setting option for performing information search only when voice data inputted through the microphone 11 is repeated two or more times. The user may set the repeated input through the input interface and may arbitrarily input the number of times of repetition.

The speaker 17 is a part that acoustically outputs the state of the information search apparatus, and in particular, when information corresponding to a recognized voice is searched or searched information is provided, outputs an auditory event such as a machine sound, a sound (for example, a sound saying "Bingo"), or the like in order to inform the user of this.

The user-defined voice DB 19 is a space in which voice data of search targets pre-defined by the user are stored. The user-defined voice DB 19 may exist in the information search apparatus or may exist in the search server 200 or other spaces on the Internet. The user-defined voice DB 19 is periodically updated regardless of whether it exists in the information search apparatus or an external server.

The memory 21 is a part that stores various programs and data, and may include a read only memory (ROM), a random access memory (RAM), a flash memory, or the like. The flash memory of the memory 21 may temporarily store voice data which is inputted through the microphone 11 or may store user's setting information (for example, the repeated input setting).

The communication unit 23 is a part that exchanges data with the search server 200. The communication unit 23 may transmit an information search request signal corresponding to voice data to the search server 200, and may receive a variety of information from the search server 200. The communication unit 23 may include a mobile communication module such as long term evolution (LTE), LTE-Advanced (LTE-A), a wireless Internet communication module such as wireless fidelity (Wi-Fi), and a wired Internet communication module such as Ethernet for data communication.

The voice comparison unit 25 is a part that compares voice data inputted through the microphone 11 and voice data stored in the user-defined voice DB 19. That is, the voice comparison unit 25 may determine whether the same voice data as the voice data inputted through the microphone 11 is present in the user-defined DB 19.

When it is determined that matching voice data is present as a result of comparing by the voice comparison unit 25, the controller 27 may determine whether a repeated input of the voice data is set.

When the repeated input of the voice data is set, the controller 27 may determine whether voice data matching the voice data inputted through the microphone 11 is present in the memory 21.

When the matching voice data is present in the memory 21, the controller 27 may output an event for informing the user of information search or provision, and may generate an information search request signal for requesting information corresponding to the voice data from the search server 200. When the repeated input of the voice data is not set, the controller 27 may directly output the event and generate the information search request signal.

After transmitting the information search request signal through the communication unit 23, the controller 27 may delete the corresponding voice data stored in the memory 21.

On the other hand, when matching voice data is not present in the memory 21, the controller 27 may store the voice data inputted through the microphone 11 in the memory 21 and may wait for an input of voice data again.

In addition, when voice data matching the voice data stored in the memory 21 is inputted through the microphone 11, the voice data may be deleted after the information search is requested as described above, and, when matching voice data is not inputted, the voice data may be deleted from the memory 21 after a predetermined time elapses from the time that the voice data is stored.

A process of processing information search using voice recognition in the information search apparatus configured as described above according to the present invention will be described in detail with reference to FIG. 3.

Figure 3:
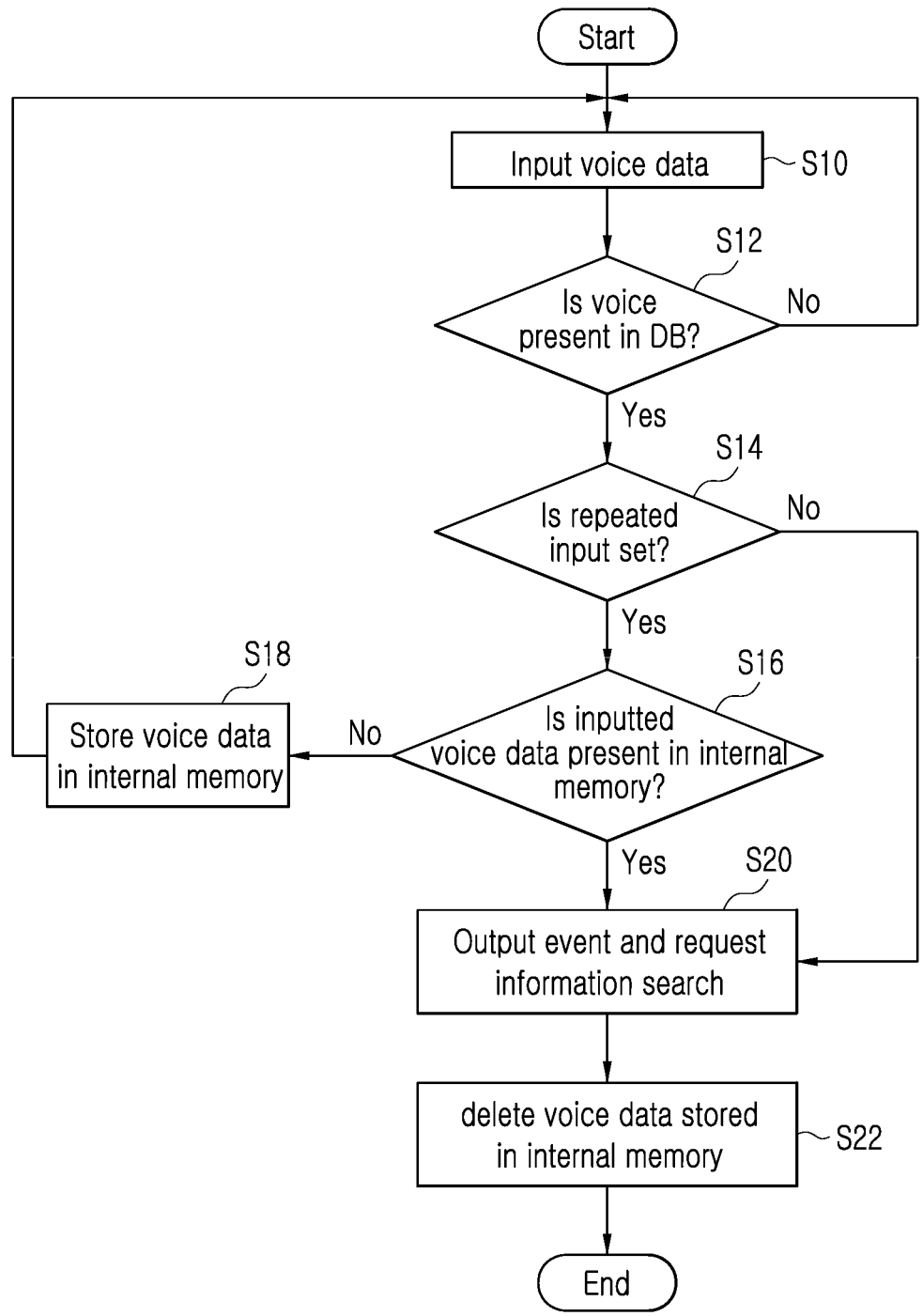
FIG. 3 is a flowchart of an information search method using voice recognition according to the present invention.

FIG. 3 is a flowchart of a method for information search using voice recognition according to the present invention.

First, when user's voice data is inputted through the microphone 11 provided in the information search apparatus 100 (S10), the information search apparatus 100 may access the user-defined voice DB 19 provided inside the information search apparatus 100 or in an external server, and may determine whether the voice data inputted through the microphone 11 is present in the user-defined voice DB 19 by comparing the voice data inputted through the microphone 11 and voice data stored in the user-defined voice DB 19 (S12).

When voice data matching the voice data inputted through the microphone 11 is present in the user-defined voice DB 19, it is determined whether a repeated input of the voice data is set (S14). When voice data matching the voice data inputted through the microphone 11 is not present in the user-defined voice DB 19, the information search apparatus 100 may not perform any operation and may wait for an input of voice data again.

As a result of determining in step 14, when the repeated input of the voice data is set, it is determined whether voice data matching the voice data inputted through the microphone 11 is present in the internal memory 21 (S16). When the repeated input of the voice data is not set, the information search apparatus 100 may directly output an event and request information search corresponding to the voice data (S20).

The event according to an exemplary embodiment of the present disclosure may be an event indicating that it is possible to search information and provide the information, and may be an auditory event outputting a specific sound, for example, "Bingo." However, the event may be a visual event such flickering an LED lamp, and may output two events simultaneously.

As a result of determining in step 16, when voice data matching the voice data inputted through the microphone 11 is not present in the memory 21, the information search apparatus 100 may store the voice data inputted through the microphone 11 in the memory 21 (S18) and may wait for an input of voice data again.

When the voice data matching the voice data inputted through the microphone 11 is present in the memory 21, the information search apparatus 100 may output the event and may request information search corresponding to the voice data (S20).

After requesting the information search corresponding to the voice data, the information search apparatus 100 may delete the corresponding voice data stored in the memory 21 (S22). The voice data stored in the memory 21 may be deleted after search for information corresponding to the voice data is requested or after a predetermined time elapses from the time that the voice data is stored in the memory 21.

As described above, when voice data to be searched is present in the user-defined voice DB 19 and a repeated input of the voice data is set, search information is only performed when the voice data is repeatedly inputted for a predetermined time, such that redundant information search according to voice recognition can be prevented.

While the invention has been shown and described with reference to certain preferred embodiments thereof, it will be understood by those skilled in the art that various changes in form and details may be made therein without departing from the spirit and scope of the invention as defined by the appended claims.

Therefore, the scope of the invention is defined not by the detailed description of the invention but by the appended claims, and all differences within the scope will be construed as being included in the present invention.

INDUSTRIAL APPLICABILITY

The present invention relates to a technology for searching and providing information corresponding to voice data only when the voice data is present in a user-defined DB and is repeatedly inputted, and is widely used in the information search field using voice recognition.

The invention claimed is:

1. A method for searching information corresponding to voice data in a voice recognition-based information search apparatus, the method comprising the steps of:
   when voice data for searching information is inputted through a microphone, comparing, by a processor, the inputted voice data and voice data stored in a user-defined voice database;
   when matching voice data is present as a result of the comparing, determining, by the processor, whether a repeated input setting option of the voice data is set through a user device;
   when the repeated input setting option of the voice data is set as a result of the determining, determining whether or not the voice data is repeatedly inputted within a predetermined time by determining, by the processor, whether voice data matching the inputted voice data for searching information is present in an internal memory;
   deleting the voice data from the internal memory when the predetermined time elapses after the voice data inputted through the microphone is stored;
   when matching voice data is present as a result of the determining, outputting, by the processor, a signal for requesting information corresponding to the voice data for searching information from a search server;
   receiving the information corresponding to the voice data for searching information from the search server; and
   presenting the information corresponding to the voice data for searching information to the user device.

2. The method of claim 1, further comprising the step of, when the repeated input setting option of the voice data is not set as a result of the determining, outputting, by the processor, the signal for requesting the information corresponding to the voice data for searching information from the search server.

3. The method of claim 1, further comprising the steps of:
   when the matching voice data is not present as a result of the determining, storing the inputted voice data in the internal memory; and
   when the predetermined time elapses after the inputted voice data is stored, deleting the voice data from the internal memory.

4. The method of claim 1, further comprising the step of deleting the voice data stored in the internal memory after requesting information from the search server.

5. An apparatus for searching information using voice recognition, the apparatus comprising:
   a user-defined voice database (DB) configured to store voice data which is a target for searching information;
   a memory configured to temporarily store the voice data for searching information inputted through the microphone; and
   a processor configured to implement:
      a voice comparison unit configured to compare voice data for searching information inputted through a microphone and voice data stored in the user-defined voice DB;
      a communication unit configured to exchange data with a search server; and
      a controller connected to the voice comparison unit, and configured to
         determine whether or not the voice data is repeatedly inputted within a predetermined time by determining whether voice data matching the voice data for searching information inputted through the microphone is present in the memory, when matching voice data is present in the user-defined voice DB and a repeated input setting option of the voice data is set through the apparatus, and to delete the voice data from the memory when the predetermined time elapses after the voice data inputted through the microphone is stored, wherein the controller generates a signal for requesting information corresponding to the voice data from the search server, when the matching data is present in the memory, the communication unit is further configured to receive the information corresponding to the voice data from the search server, and the apparatus further comprises a device configured to present the information corresponding to the voice data.

6. The apparatus of claim 5, wherein the controller is further configured to delete the voice data from the memory after requesting the information from the search server.

7. The apparatus of claim 5, wherein the controller is further configured to, when the repeated input setting option of the voice data is not set, generate the signal for requesting information corresponding to the voice data from the search server.

8. The apparatus of claim 5, wherein the controller is further configured to, when voice data matching the voice data inputted through the microphone is not present in the memory, store the voice data inputted through the microphone in the memory, and when the predetermined time elapses after the voice data inputted through the microphone is stored, to delete the voice data from the memory.

* * * * *